(12) United States Patent
Kim et al.

(10) Patent No.: US 8,217,989 B2
(45) Date of Patent: *Jul. 10, 2012

(54) METHOD FOR PHOTOGRAPHING PANORAMIC PICTURE

(75) Inventors: Soo-Kyun Kim, Seoul (KR); Jae-Won Moon, Bucheon-si (KR); Sung-Dae Cho, Yongin-si (KR); Sang-Wook Oh, Ansan-si (KR); Byung-Jun Son, Seoul (KR); Tae-Hwa Hong, Seoul (KR); Hee-Won Jung, Suwon-si (KR); Nam-Ik Cho, Seoul (KR); Sang-Hwa Lee, Seoul (KR); Seong-Jong Ha, Namyangiu-si (KR)

(73) Assignees: Samsung Electronics Co., Ltd., Yeongtong-gu, Suwon-si, Gyeonggi-do (KR); Seoul National University Industry Foundation, Bongcheon-Dong, Gwanak-Gu, Seoul (KR)

( * ) Notice: Subject to any disclaimer, the term of this patent is extended or adjusted under 35 U.S.C. 154(b) by 972 days.

This patent is subject to a terminal disclaimer.

(21) Appl. No.: 12/199,007

(22) Filed: Aug. 27, 2008

(65) Prior Publication Data
US 2009/0058991 A1 Mar. 5, 2009

(30) Foreign Application Priority Data
Aug. 27, 2007 (KR) .................. 10-2007-0086105

(51) Int. Cl.
*H04N 7/00* (2011.01)
(52) U.S. Cl. ................ 348/37; 348/584; 382/284
(58) Field of Classification Search .......... 348/36, 348/37, 584; 382/284
See application file for complete search history.

(56) References Cited

U.S. PATENT DOCUMENTS
5,987,164 A * 11/1999 Szeliski et al. ........... 382/154
(Continued)

FOREIGN PATENT DOCUMENTS
EP 1980907 10/2008
(Continued)

OTHER PUBLICATIONS

Nakao, T. et al, "Panoramic camera using a mirror rotation mechanism and a fast image mosaicing," Intelligent Robots and Systems, 2004. (IROS 2004). Proceedings. 2004 IEEE/RSJ International Conference on Volume: 1, Digital Object Identifier: 10.1109/IROS.2004.1389390, Publication Year: 2004 , pp. 431-436 vol. 1.*

(Continued)

*Primary Examiner* — Oanh Duong
(74) *Attorney, Agent, or Firm* — Cha & Reiter, LLC

(57) ABSTRACT

A panoramic picture photographing method permits more accurate photographing of an image, particularly a panoramic image of a subject, without additional equipment, or separate devices and hardware. The method includes projecting an image, which is successively inputted in every predetermined unit of time, to an imaginary surface having a same focal distance in photographing each image constituting a panoramic picture to obtain a projected image; confirming movement of a corresponding photographing apparatus so that the projected image is compared with a previous image in real time by using a motion estimation technique, to which exposure correction has been applied; determining a photographing time point of each image by confirming the confirmed movement of the corresponding photographing apparatus according to a photographing direction has reached a predetermined critical value; and photographing each image at the photographing time point of each image according to a passive input or automatically.

19 Claims, 10 Drawing Sheets

U.S. PATENT DOCUMENTS

| | | | | |
|---|---|---|---|---|
| 6,009,190 A * | 12/1999 | Szeliski et al. | ................ | 382/154 |
| 6,044,181 A * | 3/2000 | Szeliski et al. | ................ | 382/284 |
| 6,097,854 A * | 8/2000 | Szeliski et al. | ................ | 382/284 |
| 6,157,747 A * | 12/2000 | Szeliski et al. | ................ | 382/284 |
| 6,532,037 B1 * | 3/2003 | Shimura | ..................... | 348/36 |
| 6,930,703 B1 * | 8/2005 | Hubel et al. | ................. | 348/37 |
| 7,400,782 B2 * | 7/2008 | Zhou et al. | .................. | 382/284 |
| 7,881,559 B2 * | 2/2011 | Park et al. | .................... | 382/284 |
| 7,958,070 B2 * | 6/2011 | Mitarai et al. | ................. | 706/25 |
| 2002/0181802 A1 * | 12/2002 | Peterson | ..................... | 382/284 |
| 2004/0042685 A1 * | 3/2004 | Zhou et al. | .................. | 382/284 |
| 2004/0189849 A1 | 9/2004 | Hofer | | |
| 2004/0239756 A1 * | 12/2004 | Aliaga et al. | ................. | 348/36 |
| 2005/0089244 A1 * | 4/2005 | Jin et al. | ........................ | 382/284 |
| 2007/0109398 A1 | 5/2007 | Teo | | |
| 2007/0159317 A1 * | 7/2007 | Nagata | .......................... | 340/461 |
| 2009/0021576 A1 * | 1/2009 | Linder et al. | ................... | 348/36 |
| 2009/0058990 A1 * | 3/2009 | Kim et al. | ....................... | 348/36 |

FOREIGN PATENT DOCUMENTS

KR    2005-13861    2/2005

OTHER PUBLICATIONS

Kang et al., "Characterization of errors in compositing panoramic images," Computer Vision and Pattern Recognition, 1997. Proceedings., 1997 IEEE Computer Society Conference on Digital Object Identifier: 10.1109/CVPR.1997.609306 Publication Year: 1997 , pp. 103-109.*

Ha, Seong Jong, et al.; "Embedded Panoramic Mosaic System Using Auto-Shot Interface;" IEEE Transactions on Consumer Electronics, vol. 54, No. 1; New York, NY; Feb. 1, 2008; XP011205755.

Zinber, Timo, et al.; "Efficient Feature Tracking for Long Video Sequences;" 26$^{th}$ DAGM Symposium, Lecture Notes in Computer Sci ; vol. 3175; Germany; 2004; p. 326-333.

* cited by examiner

METHOD FOR PHOTOGRAPHING PANORAMIC PICTURE

CLAIM OF PRIORITY

This application claims priority under 35 U.S.C. §119(a) from an application entitled "Method For Photographing Panoramic Picture filed in the Korean Intellectual Property Office on Aug. 27, 2007 and assigned Serial No. 2007-0086105, the contents of which are hereby incorporated by reference in its entirety.

CROSS-REFERENCE TO RELATED APPLICATIONS

This application is related to U.S. Application Ser. No. 12/231,077 filed on Aug. 29, 2008, which claims priority from a case entitled "Method for Photographing a Panoramic Picture", based on Korean Priority application 2007-0087087 filed Aug. 29, 2007.

BACKGROUND OF THE INVENTION

1. Field of the Invention

The present invention relates to digital image photography in diverse complex apparatuses having a function of photographing a digital image, including digital cameras, as well as mobile communication terminals having a camera module. More particularly, the present invention relates to a method for photographing a panoramic image and the plurality of images making up the panoramic image.

2. Description of the Related Art

In general, an image capture unit has a function of obtaining an image in a digital image photographing apparatus, and can obtain an image formed within a focal length of a lens thereof. Here, the obtained image is within a range of the viewing angle (between about 30° to 50° for general cameras), which is smaller than an actual human visual angle (between about 150° to 200°).

A conventional method of photographing multiple images includes acquiring the images while properly changing the viewing angle, and inter-connecting the photographed images in sequence to reorganize them into one consecutive image, thereby obtaining a picture with a viewing angle similar to or larger than the human visual angle. Such a conventional method is called a panoramic image photographing method.

In a panoramic image photographing mode, the conventional digital image photographing apparatus captures several images to be inter-connected horizontally or vertically, and then stores them in a memory. The images stored in the memory are provided to an appropriate interior/exterior image processor later, and are inter-connected into one consecutive image. At this time, in order to eliminate color differences and image discords at the boundaries between the images, digital image photographing apparatuses photograph multiple images with sufficient overlap between their boundaries, and then align the images by adjusting their boundaries. Thereafter, they perform image processing, including stitching and bending. Through this process, a single image including naturally inter-connected multiple images is obtained.

Accordingly, high priority in photographing a panoramic image is accorded to the capture of such images being aligned as accurately as possible. To this end, an accessory apparatus, such as a tripod, is usually used in manual photographing by a user. Recently, a method has been suggested in which a corresponding photographing apparatus is mounted on a tripod or the like, and the mounted photographing apparatus is rotated according to respective images in panorama photographing. An example of such a method is disclosed in Korean Patent Application No. 2003-0052444 filed on Jul. 29, 2003, entitled "Camera And Method for Photographing Panorama Picture" the application of which is Samsung Techwin Co. Ltd., and the inventor of which is BAE, Sung-cheol. Further to the above-described methods, an apparatus having a function of detecting a rotation angle may be additionally mounted on the corresponding photographing apparatus, and a user sets the rotation angle of the photographing apparatus in advance so that the respective images are photographed by rotational displacement over the rotation angle of the photographing apparatus pre-set by the user in panorama photographing, of which a method has been also suggested.

Furthermore, in order to align the respective images more accurately when photographing panoramic images without mounting an accessory element or additional hardware on the corresponding photographing apparatus, a method has been provided in which the partial region of the border of a previously photographed image is represented appropriately overlapping with the current image for photographing when photographing respective images, so that the user can control an appropriate position for photographing by adjusting the pre-photographed image with the current photographing image. An example of such the method is disclosed in US Publication No. 2004/0189849 filed on Mar. 31, 2003, entitled "Panoramic Sequence Guide" in the name of inventor Gregory V Hofer.

Photographing the panoramic image requires increased complexity and proficiency versus photographing a general single image, and this process has long had a need for better and more convenient solutions for manipulating and photographing images.

Meanwhile, FIG. 1 is a view illustrating relation between respective photographic images that make up a panoramic image. In a case where a camera obtains an image in such a manner that it rotates θ degrees at a horizontal direction, the camera converts a real three-dimensional image, such as a first subject or a second subject, etc., to a first image or a second two-dimensional image so as to display it. In the case where such images are combined with each other so as to implement a picture, distortion is generated due to the different perspectives, so that it is difficult to estimate an overlapped portion between images different from each other. As a result, it is impossible to form a truly natural panoramic picture.

For example, in a case where the first image and the second image, which are obtained through a method illustrated in FIG. 1, are images of FIGS. 2A and 2B, respectively, and respective portions of the two images, which are obtained by photographing the same area, are overlapped with each other, as shown in FIG. 3, the portions, which are obtained by photographing the same area, aren't equal to each other, and the overlapping portion is distorted.

Accordingly, a method for generating a more accurate panoramic picture in such a manner that respective portions of a plurality of images, which are obtained by photographing the same area, are equal to each other.

SUMMARY OF THE INVENTION

Accordingly, the present invention provides a panorama picture photographing method, which is simpler to operate than methods known heretofore and allows for a user to photograph an image, particularly a panoramic image of a subject without additional equipment, separate devices or hardware.

Also, the present invention provides a method for accurately detecting movement of a camera in such a manner that an image captured by the camera is corrected under consideration of the relation between the image and a real image of a subject, and the corrected image is reflected.

In accordance with an exemplary aspect of the present invention, there is provided a panoramic picture photographing method including the steps of: projecting an image, which is successively inputted in every predetermined unit of time, to an imaginary surface having a same focal distance in photographing each image constituting a panoramic picture so as to obtain a projected image; confirming movement of a corresponding photographing apparatus in such a manner that the projected image is compared with a previous image in real time by using a motion estimation technique, to which exposure correction has been applied; determining a photographing time point of each image by confirming a fact that the confirmed movement of the corresponding photographing apparatus according to a photographing direction reaches a predetermined critical value; and photographing each image at the photographing time point of each image according to a passive input or according to an automatic manner.

In accordance with another exemplary aspect of the present invention, there is provided a panoramic picture photographing method, in which movement of a photographing apparatus is confirmed, the method including: projecting an image inputted in real time to an imaginary surface having a same focal distance and obtaining the projected image; confirming matching image blocks between a currently input frame and a previous frame of the projected image; confirming movement of the photographing apparatus by obtaining a motion vector between the confirmed matching image blocks, wherein, in confirming the image blocks matching with each other, respective pixels of the image block of respective frames is corrected according to an average value of a corresponding image block, and a motion vector between the matching image blocks is obtained by using error information regarding the respective corrected pixels, which are compared with each other between the image blocks of respective frames.

BRIEF DESCRIPTION OF THE DRAWINGS

The above and other aspects, features and advantages of the present invention will become more apparent from the following detailed description taken in conjunction with the accompanying drawings, in which.

DETAILED DESCRIPTION

Hereinafter, exemplary embodiments according to the present invention will be described with reference to the accompanying drawings. In the description herein below, many particular items such as a detailed component device are shown only for illustrative purposes to provide a general understanding of the present invention to a person of ordinary skill in the art, and the claimed method for photographing a panoramic picture is not limited to the examples shown and described herein. Also, a person of ordinary skill in the art understands and appreciates that various changes in form and details may be made therein without departing from spirit of the invention and the scope of the appended claims.

Figure 1:
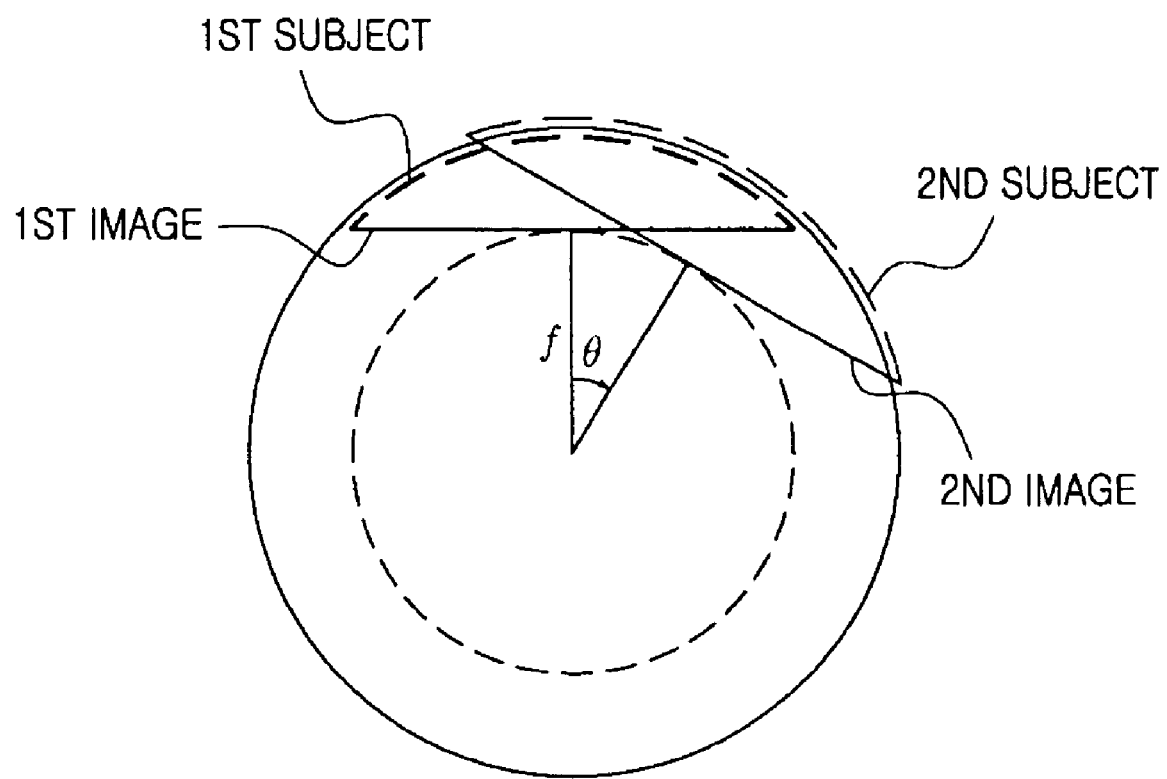
FIG. 1 is a view illustrating relation between respective photographic images in photographing a panoramic picture.
Figure 2A:
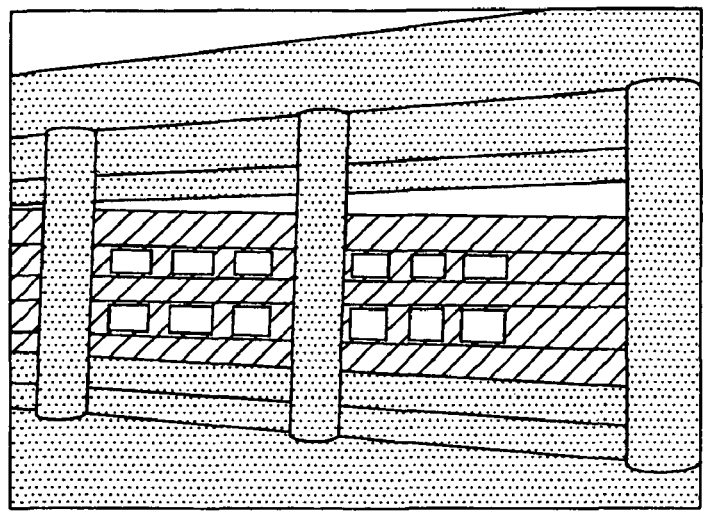
FIGS. 2A and 2B are views illustrating an example of a picture obtained by photographing a first image and a second image of FIG. 1.
Figure 2B:
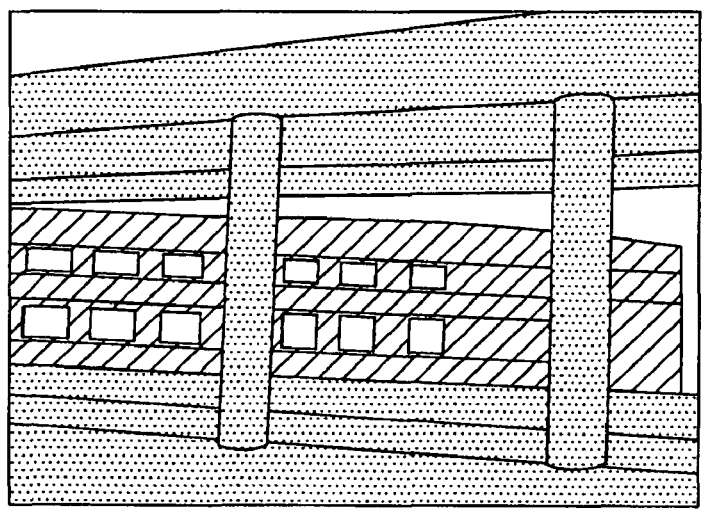
Figure 3:
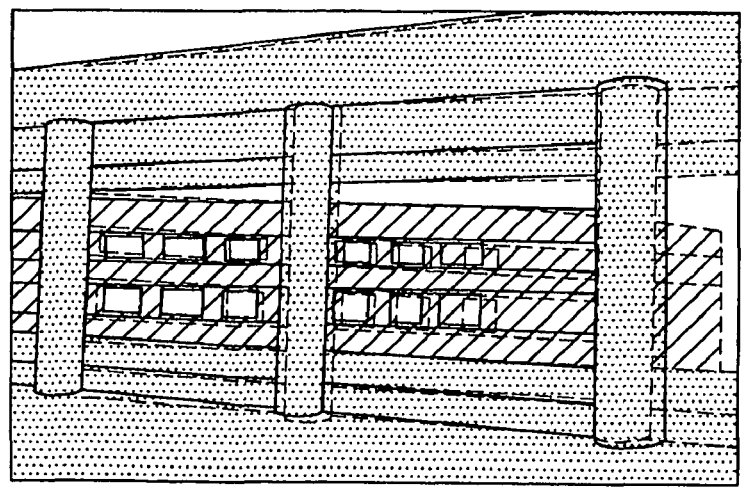
FIG. 3 is a view illustrating a picture where the first image and the second image of FIG. 2 are arranged under consideration of each same portion of the first and second images.
Figure 4:
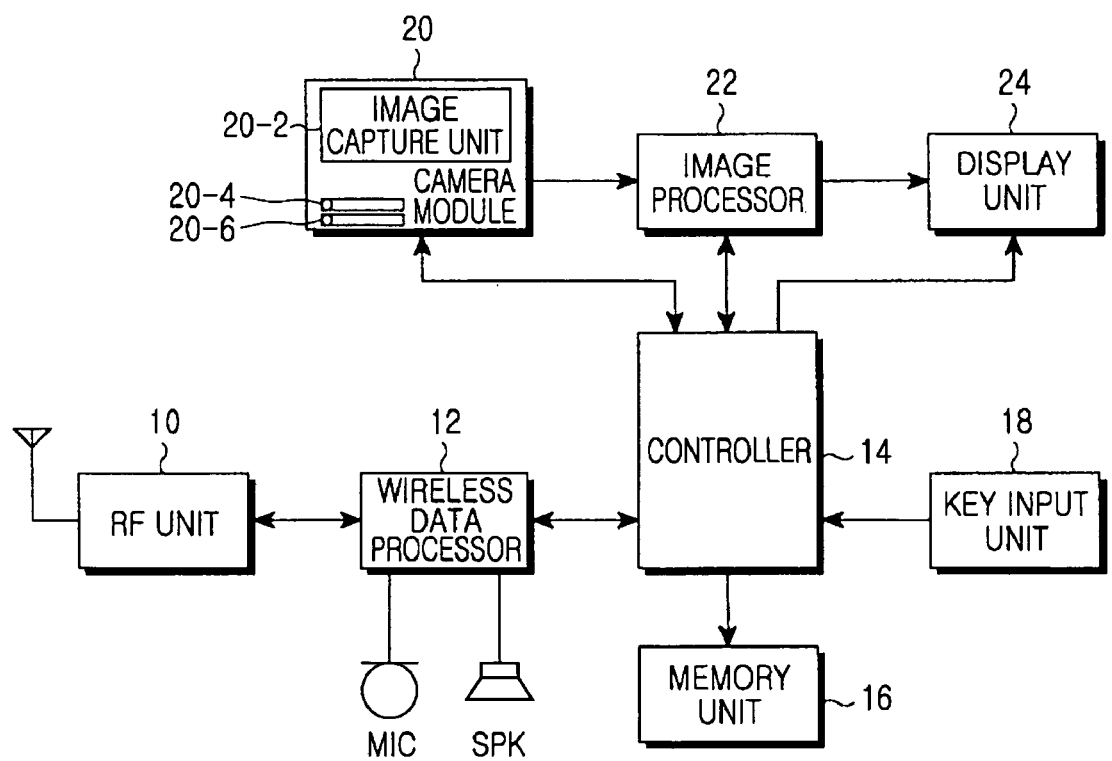
FIG. 4 is a block diagram of a portable terminal to which the present invention is applied.

FIG. 4 is an exemplary block diagram of the portable terminal to which the present invention is applied. In the present invention, as shown in FIG. 4, firstly, the portable terminal is an example of a hardware-type base apparatus among various apparatuses that can perform a digital image photographing function described herein below.

Referring to FIG. 4, a portable terminal having a digital image photographing function includes a camera 20, an image processor 22, a display unit 24, a controller 14, a memory unit 16, a key input unit 18, a wireless unit 10, and a wireless data processor 12.

The wireless (RF) unit 10 converts the voice of a user, characters, and control data to wireless signals so as to transmit them to a base station (not shown) of a mobile communication network. Also, the wireless unit 10 receives a wireless signal from the base station and demodulates them into voices, characters, control data, etc. so as to output them. The wireless data processor 12 is operated through the controller 14. The wireless data processor 12 decodes voice data received by the wireless unit 10 and outputs it as audible sounds through a speaker to the user. Also, the wireless data processor 12 converts a voice signal of a user, which is inputted through a microphone, to data and outputs them to the wireless unit 10. Also, the wireless data processor 12 provides the inputted characters and controlling date to the controller 14 through the wireless unit 10. A person of ordinary skill in the art understands and appreciates that the functions of the RF unit 10 and the wireless data processor 12 shown in FIG. 4 can be combined into a single box.

The camera 20 performs digital camera functions under the control of the controller 14 so that the camera 20 receives a visible light signal of a specific wavelength band, which is reflected from a subject. The camera 20 has a photographing unit 20-2 constituted by, for example, a charge-coupled device (CCD), etc. In addition, the camera 20 may include a distance sensor 20-6 for measuring a focal distance respective to a subject, etc. The image processor 22 processes image data outputted to the camera 200 and converts the data into a proper digital image data format.

The input unit 18 is an apparatus for receiving telephone numbers or characters that are inputted by the user. The input unit 18 typically includes functions keys for inputting numeral information or character information, and function keys for installing various kinds of functions, and outputs signals inputted by these keys to the controller 14. It is within the spirit of the invention and scope of the appended claims that the input could also include voice activated functions that supplement or replace some/all of the functions keys. The display unit 24 can be a display apparatus such as a Liquid Crystal Display (LCD), etc., and under the control of the controller 14, displays digital image data obtained by photography as well as messages regarding various kinds of operation states of a corresponding terminal.

By the operation of the controller 14, overall operations of the mobile communication terminal are controlled in such a manner that the operation of each function units is integrally controlled. Particularly, the controller 14 performs a process according to a number and menu selection signal inputted through the key input unit 18, receives an external photographing signal through the camera 20, performs a corresponding process according to the external photographing signal, and outputs an image output signal required for various kinds of operations, including a camera photographing image through the display unit 24. At this time, according to necessity, the controller 14 gets content stored in the memory unit 16, to be outputted, or stores the content in the memory unit 16. The memory unit 16 stores a plurality of programs and data in relation to the operation of the controller 14, and also stores information required for use of the portable terminal and camera photography image information.

The portable terminal having such a configuration performs a typical operation regarding a mobile communication service including a camera function. At this time, in addition to the above described functions, the controller 14 performs a panoramic image photographing operation according to the present invention. In addition, the memory unit 16 stores an operational program and related information for the panoramic image photographing operation performed in the controller 14 according to the present invention, and outputs corresponding information to the controller 16.

According to an exemplary aspect of the present invention, when a panorama photographing operation is performed, the portable terminal receives the image of a subject, similar to a moving picture, in real-time. Also, in a case where there is movement of the portable terminal, movement that may be caused by a user according to a photographing direction, or where the portable terminal is moved by a separate apparatus for allowing the portable terminal to automatically rotate in such a manner that the terminal is assembled with the apparatus, the portable terminal determines/calculates movement of the corresponding portable terminal by comparing a current image, which is being inputted, with a previous image, and checks a movement direction and a movement degree. Next, the portable terminal performs an operation of obtaining sequential images for generating a proper panoramic image. Hereinafter, with reference to accompanying drawings, the image photographing operation according to the present invention will be described in further detail.

Figure 5:
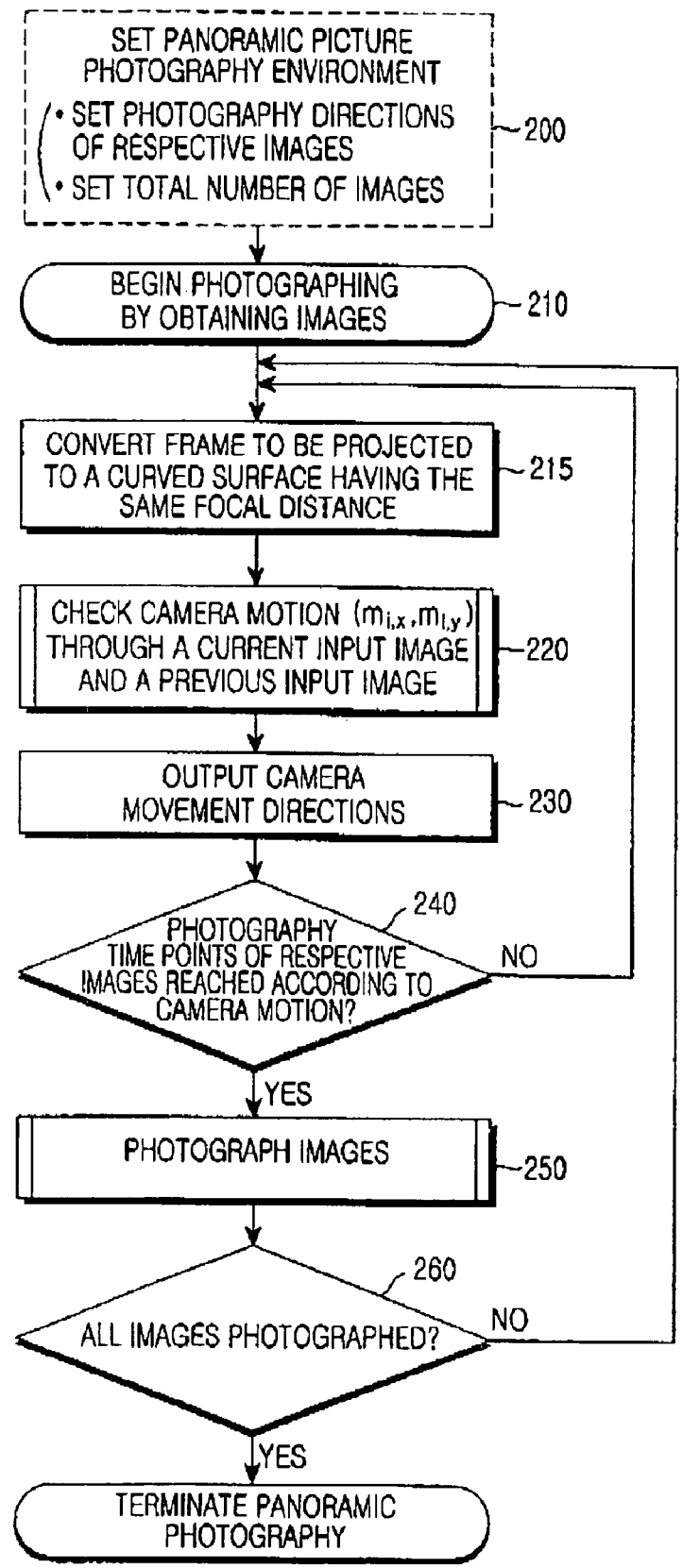
FIG. 5 is a flow chart showing exemplary operative steps of a panoramic picture photographing method according to one exemplary embodiment of the present invention.

FIG. 5 is a flow chart illustrating one particular exemplary operation of the panoramic image photographing operation according to an exemplary embodiment of the present invention. Referring to FIG. 5, firstly, various photographing environments for the panoramic image photography is set up in step 200, which is previously performed before a real panoramic image photographing operation is performed.

In step 200, a connecting direction, such as up, down, left, and right directions of each image constituted of a panorama picture, that is, a photographing direction, is set up. Also, the number of photographing images to be connected so as to configure a panoramic picture is set up.

In response to a detected selection of menu items for setting up various functions typically performed by a portable terminal, for example, among sub-menus of a camera photographing menu, a 'panoramic picture photography environment setting mode' menu, the panorama picture photography environment setting operation is performed in step 200 so that each environment setting value is set to a user's selection. Of course, a configuration and an operational program for displaying a corresponding menu item for such a menu selection operation and confirming the key input to the key input unit from the user have been previously prepared in the portable terminal. Also, it is possible that some or all panoramic picture photographing environment items set up by the user in step 200 are fixed to proper values, such as for example, default values, which have been previously set up by a developer and provided.

Then, in step 210, in response to a detected selection of 'a panoramic image photographing mode,' among menu items of the portable terminal, e.g. among sub-menus of the camera photographing menu, and can begin to perform panoramic photography by photographing a first panoramic image of a panoramic photograph. At this time, the first image of the panoramic picture is stored by a shutter input from the user by a method similar to a typical photographing method. Then, subsequent image photography processes can be performed based on the panoramic image photographing method according to the present invention, which will be described. As such, when panoramic picture photography is started, an image, which is inputted to the photographing apparatus, is stored in the memory from a starting point in time in real time per a predetermined time unit (e.g. $\frac{1}{15}$th of a second). That is, the image inputted into the photographing apparatus is inputted just like a moving picture so that a frame constituting the image is stored into each memory. Herein, the frame constituting the image is an image used for confirming movement of the camera. This frame may be used only for motion confirmation, or may be part of the panoramic picture. Therefore, the frame can be an image different from an image constituting a panoramic picture. In a case where the frame is used only for confirming movement of the camera, if the quality of the image of the frame is quality required in the step of confirming movement of the camera, which will be described below, the quality is enough.

In other words, the number of pixels of the frame can be set as the number of pixels required in confirming the movement of the camera.

Figure 6A:
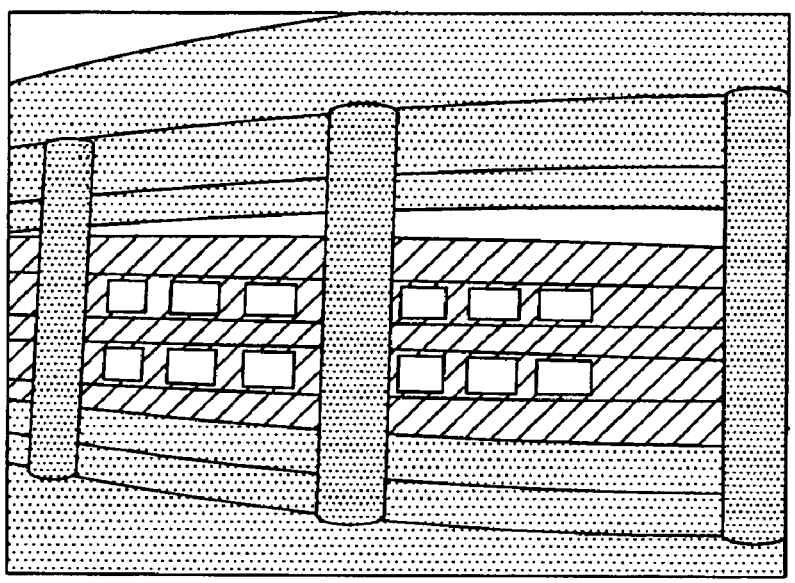
FIGS. 6A and 6B are views illustrating a composite image obtained by projecting the first image and the second image of FIG. 2 to a cylinder.
Figure 6B:
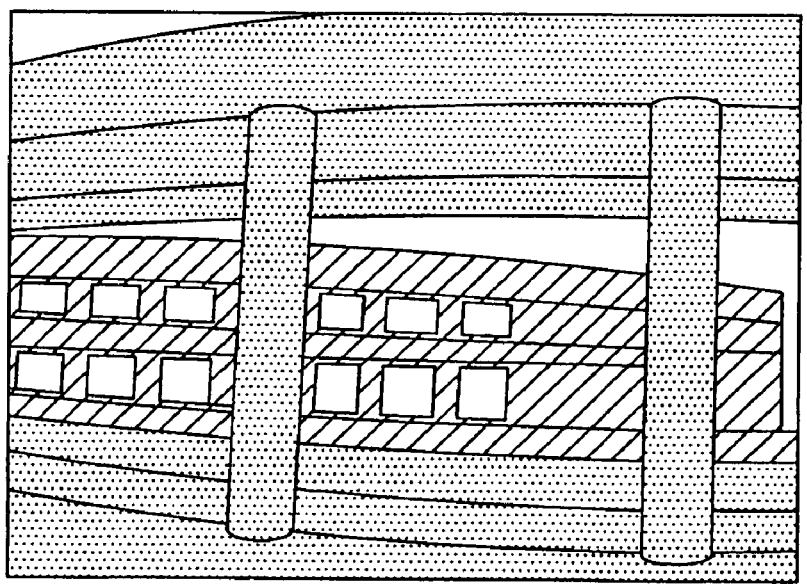

In step 215, if the frame is inputted from the photographing apparatus, the frame is converted so as to be projected to a curved surface having the same focal distance (e.g. a cylindrical surface, a spherical surface, etc.). That is, in step 215, chroma value and color value of each pixel constituting the image frame are applied to an image projection algorithm so that new image, which has been projected to a cylindrical surface or a spherical surface, is generated. For example, if the frame inputted through step 210 is an image illustrated in steps 2A and 2B, the new image generated through step 215 may be an image converted to be the same as the image illustrated FIGS. 6A and 6B.

Then, the image generated through step 215 is used in step 220. That is, among images generated in such a manner that images frame successively inputted at a predetermined unit of time are converted in real time, the corresponding apparatus, i.e. the movement of the camera, is confirmed by using an image inputted in a current unit of time and an image inputted in a previous unit of time.

Preferably, in step 220, a motion vector between blocks is obtained and the movement of the camera can be confirmed. Also, the motion vector between the blocks can be obtained by comparing and matching image blocks, which have a properly set size, of the current frame and the previous frame with each other. For example, the motion vector between the blocks can be obtained through a method similar to a method used in the conventional motion estimation and motion compensation technique when a moving picture is encoded and decoded. In the description of the present invention, the motion vector corresponding to a transverse direction, i.e. an X axis, is defined as $m_{i,x}$ and a motion vector corresponding to a vertical direction, i.e. a y axis, is defined as $m_{i,y}$ (herein, i is a frame number).

Then, in step 230, a movement direction, in which the camera has to move so as to photograph a panoramic image according to movement of the camera, which has been checked in step 220, is notified to the user through a proper User interface (UI) by either visual or audible cues, or both. At this time, the current direction where the camera is preferably moved can be displayed through the display unit by using a proper icon, etc.

For example, in a case where current panoramic picture photography is performed from a left side to a right side, if it is detected that the current camera is moving in a left direction/a stop/a right direction by the motion vector $m_{i,x}$ of the X axial, Then, the camera can display an icon of an arrow indicating the right direction on the preview screen so as to induce the user to move the camera in a proper panoramic picture photographing direction. It is also possible that an audible cue, for example, a word or phrase such as "move right" could be output in lieu of or addition a visual cue.

Also, in a case where the motion vector $m_{i,y}$ of the y axis is accumulated according to equation (1) below so that a position value of the current camera is deviated from a predetermined critical value ($\tau_2$ in equation (1) below) toward an upper or lower direction, a proper shaped icon for warning the user of the deviation of the camera can be displayed on a preview screen.

$$|\Sigma m_{i,y}| \leq \tau_2 \qquad (1)$$

Then, it is confirmed in step 240 if the current time is a time point when each image has to be photographed according to camera movement confirmed in step 220. If it is photographing a time point of each image, step 240 proceeds to step 250, or if not, step 240 proceeds to step 220, so that the above described procedure is repeatedly performed.

For example, in a case where the current panoramic image photography is performed from the left direction to the right direction, the motion vector $m_{i,x}$ of the x axis is accumulated according to equation (2). If the accumulated value reaches a predetermined critical value ($\tau_1$ in equation (2) below) as shown in equation (2), it can be determined that it is the photography time point of the current image.

$$\Sigma m_{i,x} \geq \tau_1 \qquad (2)$$

Then, in step 250, a corresponding image is obtained, and at this time, it is possible to notify the user of the fact that a current position of the camera corresponds to an image photographing time point through a proper UI, similar to the notification regarding camera direction. Also, the image can be obtained by performing an image photographing operation according to a shutter input by the user base on a predetermine photographing environment, e.g. based on if a panoramic picture is photographed in a passive manner or an automatic manner, or the image photographing operation can be automatically performed. Of course, the set of the panoramic picture passive/automatic photography can be performed together with the set of the panoramic picture photographing environment in step 200. Furthermore, in a case where a photographing operation is automatically performed, an image frame inputted so as to confirm the movement of the camera is used without any change, or an image frame projected to a cylindrical surface or a spherical surface can be obtained as an image constituting a panoramic picture. Also, it is possible to make an image constituting a panoramic picture in such a manner that an image obtained through photography is projected to a curved surface having the same focal distance.

Next, after step 250, in which the images are photographed, in step 260 there is a confirmation that the number of current images that have been photographed has reached the whole number of the predetermined images. If it is confirmed that the number has not reached the whole number, step 260 returns to step 220 so as to repeatedly perform the above described procedure. If it is confirmed that the number has reached the whole number, the panorama photography is finished. At this time, when step 260 returns to step 220, the value of motion vectors, particularly, $\Sigma m_{i,x}$, which is the sum total of motion vector $m_{i,x}$ of the x axis, is reset as an initial value (0). Also, after the panoramic photography is finished, photographed panorama images are connected with each other so as to generate one panoramic picture. In order to smoothly connect theses images, it is possible that typical image process methods, such as aligning, stitching, or blending can be applied.

According to whole procedure illustrated in FIG. 5, it can be understood that the photographing apparatus is moved, for example, from a left side to a right side according to a photographing direction in photographing a panorama. While movement is disclosed above as being effectuated by a user, it is possible there is an automatic movement of the image capturing and no visual or audible cues are necessary.

In the present invention, it is assumed that an image frame is inputted with a predetermined speed so as to be projected to a cylindrical surface or a spherical surface during operation of panoramic picture photography. Also, it is assumed that a motion blur phenomenon does not occur at all inputted image frames. Accordingly, while the camera performs panoramic picture photography, the camera moves from a left side to a right side with a predetermined speed so as to obtain images having a predetermined width, which are automatically overlapped with each other. Also, motion vector of input images according to a photographing direction (e.g. a direction from a left side to a right side), e.g. a motion vector $m_{i,x}$ of the X axis is accumulated. Therefore, whenever the accumulated value reaches a predetermined critical value ($\tau_1$), each image can be obtained. Based on this, if it is set that a panoramic picture is automatically photographed when a panoramic picture photography environment is set, each image constituting a panoramic picture is automatically obtained at a proper position as the user moves the photographing apparatus (according to the critical value $\tau_1$).

Meanwhile, a method for obtaining a new image (hereinafter, referred to as a projected image) by projecting an inputted image frame, which includes the detailed procedure of step 215, will be described hereinafter. Although it is described that an image frame is projected to a cylindrical space according to the method, while will be described below, this is illustrated only for illustrative purpose to help understanding and doesn't limit the present invention.

Figure 7:
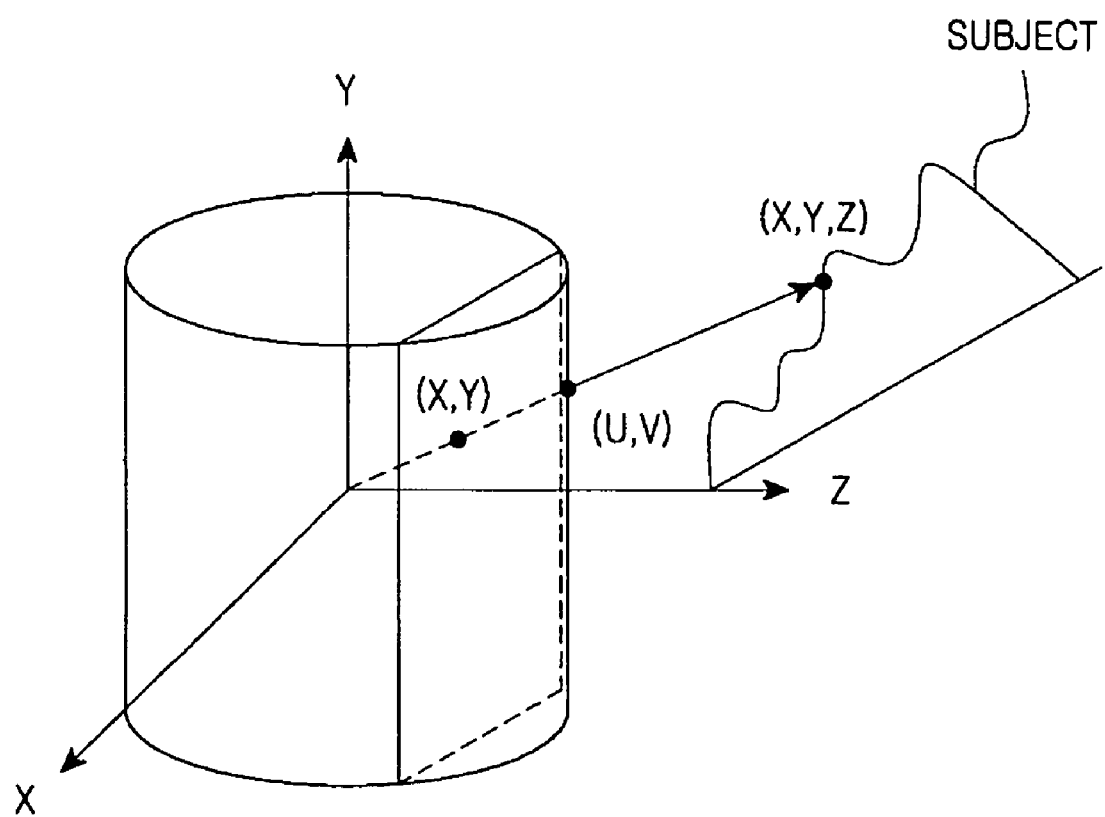
FIG. 7 is a view illustrating a concept of relation between an image frame, a projected image, and a subject according to a panoramic picture photographing method according to one exemplary embodiment of the present invention.
Figure 8:
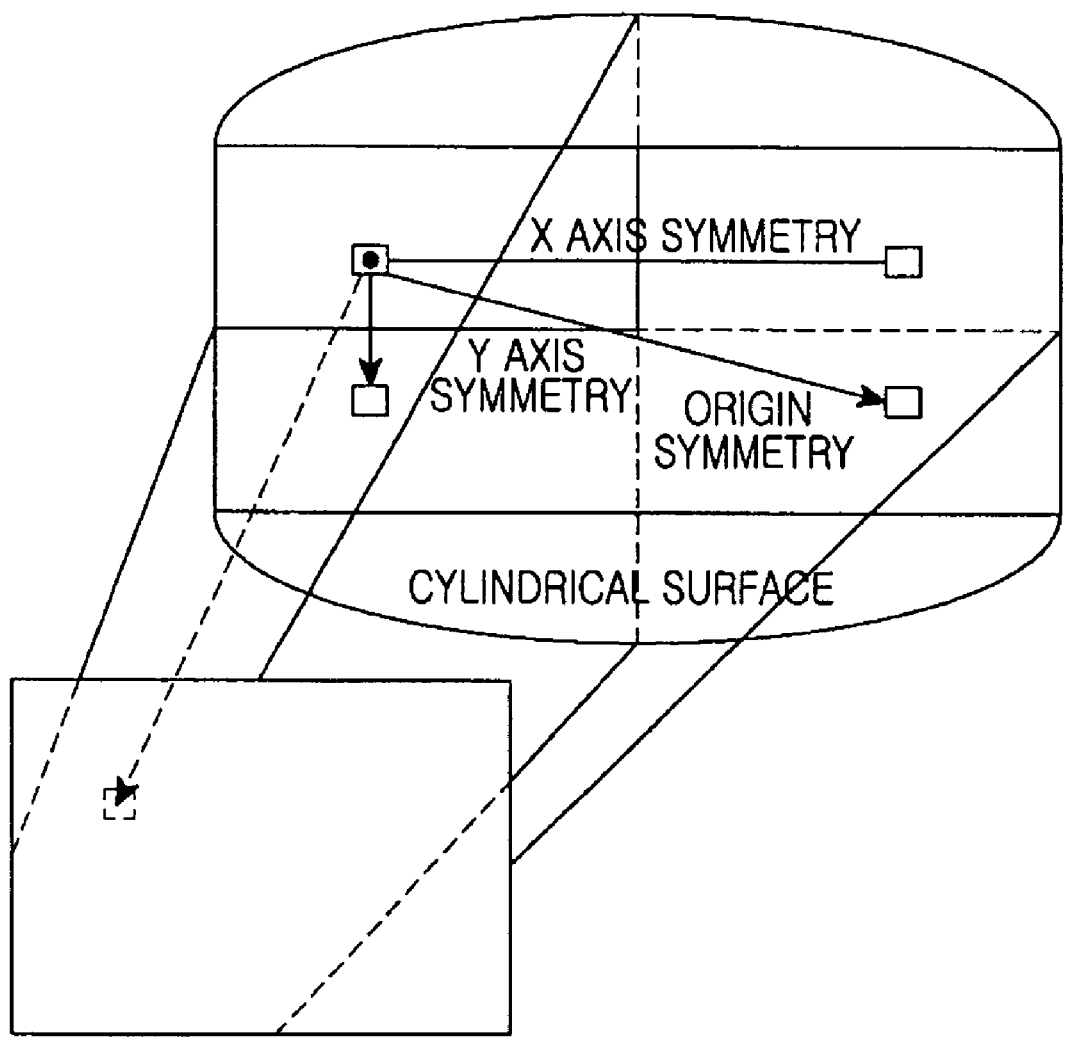
FIG. 8 is a view illustrating a symmetrical structure of a picture based on a center of an image projected to a curved surface of a cylinder in photographing a panorama mosaic picture according one exemplary embodiment of the present invention.

FIG. 7 is a view illustrating a concept of relation between an image frame, a projected image, and a subject according to a panoramic picture photographing method according one exemplary embodiment of the present invention. Referring to FIG. 7, a point in the three-dimensional space of a subject is indicated by using coordinate (X,Y,Z) and a point of an image frame processed as a two-dimension through the camera is indicated by using (x,y). The image coordinates system has the center of the image frame as an origin. The width of an image frame I is defined as W, and the height thereof is defined as H. A pixel corresponding to a coordinate (x,y) of the image frame inputted through the camera is defined as I(x,y). In a case where (x,y) is an integer, I(x,y) accurately indicates a pixel value corresponding to (x,y), and in a case where (x,y) is a real number, I(x,y) indicates a pixel value expressed using a result obtained through linear interpolation from four surrounding pixels.

P=(X,Y,Z), which is the coordinate of a three-dimensional space can be converted to (u,v)=(Rθ,v), which is a cylindrical coordinate of a cylinder having a radius R, by using equation (3) below.

$$u = R\tan^{-1}\left(\frac{x}{z}\right)$$
$$v = \frac{Ry}{\sqrt{x^2 + z^2}}$$
(3)

At this time, it is assumed that the camera faces a Z axis while the center of the camera is set as the center of the coordinate of a three-dimensional space, and Y axial rotation of the camera corresponds to movement of the cylindrical surface in a horizontal direction in parallel so that a three-dimensional point P=(X,Y,Z) can correspond to a point of the cylindrical coordinate and an image as shown in equation (4) below.

$$\left(f\frac{X}{Z}, f\frac{Y}{Z}\right) \leftrightarrow \left(\tan^{-1}\frac{X}{Z}, \frac{RY}{\sqrt{X^2 + Z^2}}\right)$$
(4)

Therefore, point (x,y) positioned at the photographed image frame corresponds to $$(u, v) = \left(R\tan^{-1}\frac{x}{f}, \frac{Ry}{\sqrt{f^2 + x^2}}\right)$$

on the cylindrical coordinate, and in opposition, point (u,v)=(Rθ,v) on the cylindrical coordinate corresponds to $$\left(f\tan\frac{u}{R}, f\frac{v}{R\cos(u/R)}\right)$$

on the photographed image frame. As a result, point (u,v) on the cylinder can be indicated as $$I\left(f\tan\frac{u}{R}, f\frac{v}{R\cos(u/R)}\right),$$

and point (x,y) positioned at the image frame photographed through calculation, to which $$I\left(f\tan\frac{u}{R}, f\frac{v}{R\cos(u/R)}\right)$$

is applied, can be converted to (u,v) on the cylinder. Based on this, (x,y) positioned at the photographed image frame is converted to point (u,v) on the cylinder so that the photographed image frame (I) can be projected to the cylindrical space.

Furthermore, in a case where the photographed image frame is projected to the cylindrical space by using the above described scheme, the calculation is large, so that it may be difficult to implement such a calculation in real time under the level of limited hardware. It is preferable that an image frame is projected to the cylindrical space by using the scheme, which will be described below.

If a result of projection to a cylindrical space is obtained by using a back-projection scheme, as described above, the result is the same as equation (5) so that a proper pixel value can be obtained respective to a certain point on the cylindrical space.

$$I\left(f\tan\frac{u}{R}, f\frac{v}{R\cos(u/R)}\right)$$
(5)

However, it is difficult to obtain equation (5) only through fixed-point calculation. Therefore, in the present invention, in order to resolve a problem of implementing a conventional floating point calculation, equation (5) can be changed to be suitable for fixed-point calculation in such a manner that equation (5) is approximated to equation (6).

$$\left(f\tan\frac{u}{R}, f\frac{v}{R\cos(u/R)}\right) = \left(f\frac{R\sin(u/R)}{R\cos(u/R)}, f\frac{v}{R\cos(u/R)}\right)$$
$$= \left(f\frac{R\sin(u/R)}{\sqrt{R^2 - R^2\sin^2(u/R)}}, f\frac{v}{\sqrt{R^2 - R^2\sin^2(u/R)}}\right)$$
(6)

Hereinafter, approximation to u≈R sin(u/R) is achieved in equation (6), point (u,v)=(Rθ,v) of the cylindrical space coordinate can be shown as a photographed image defined according to equation (7) below.

$$\left(f\frac{u}{\sqrt{R^2 - u^2}}, f\frac{v}{\sqrt{R^2 - u^2}}\right)$$
(7)

The best advantage of an approximate equation, such as equation (7), is that it can be implemented without real number calculation. A square root equation can be calculated without real number calculation. Therefore, in a case where floating point calculation is impossible, such an approximate equation can be implemented in a simpler manner. Meanwhile, R can be defined according to equation (8) below so as to allow magnification of an output image to be nearly equal to magnification of an input image.

$$R = \sqrt{f^2 + \left(\frac{W}{2}\right)^2} \qquad (8)$$

Finally, the image projected to the cylindrical space can be obtained when (u,v) becomes the value of equation (9) above within a range approximately satisfying $-W/2 \leq u \leq W/2$, $-H/2 \leq v \leq H/2$. That is, the image projected to the cylindrical space can obtained through calculation of equation (9) below.

$$I\left(f\frac{u}{\sqrt{R^2-u^2}}, f\frac{v}{\sqrt{R^2-u^2}}\right) \qquad (9)$$

Furthermore, if a procedure of performing the above calculation is shown as a pseudo-code, it can be shown as table (1) below.

TABLE 1

Algorithm for Projection to a Cylindrical Space

For v = 0~H/2
  For u = 0~W/2
    Compute $$I\left(f\frac{u}{\sqrt{R^2-u^2}}, f\frac{v}{\sqrt{R^2-u^2}}\right)$$

$$I\left(f\frac{-u}{\sqrt{R^2-u^2}}, f\frac{v}{\sqrt{R^2-u^2}}\right)$$

$$I\left(f\frac{u}{\sqrt{R^2-u^2}}, f\frac{-v}{\sqrt{R^2-u^2}}\right)$$

$$I\left(f\frac{-u}{\sqrt{R^2-u^2}}, f\frac{-v}{\sqrt{R^2-u^2}}\right) \text{ using symmetry.}$$

End u
End v

Also, as described above, although a pixel value corresponding to (u,v) on the cylindrical surface can be obtained in such a manner a pixel value correspond to $$I\left(f\frac{u}{\sqrt{R^2-u^2}}, f\frac{v}{\sqrt{R^2-u^2}}\right)$$

on the two-dimensional surface of an image through calculation of $\sqrt{R^2-u^2}$ is obtained, it is possible to obtain pixel values corresponding to (−u,v), (u,−v), (−u,−v) without a separate calculation in such a manner that pixel values positioned at $$I\left(f\frac{-u}{\sqrt{R^2-u^2}}, f\frac{v}{\sqrt{R^2-u^2}}\right), I\left(f\frac{u}{\sqrt{R^2-u^2}}, f\frac{-v}{\sqrt{R^2-u^2}}\right),$$

$$I\left(f\frac{-u}{\sqrt{R^2-u^2}}, f\frac{-v}{\sqrt{R^2-u^2}}\right)$$

are obtained by using y axis symmetry, x axis symmetry, and origin symmetry.

Figure 9:
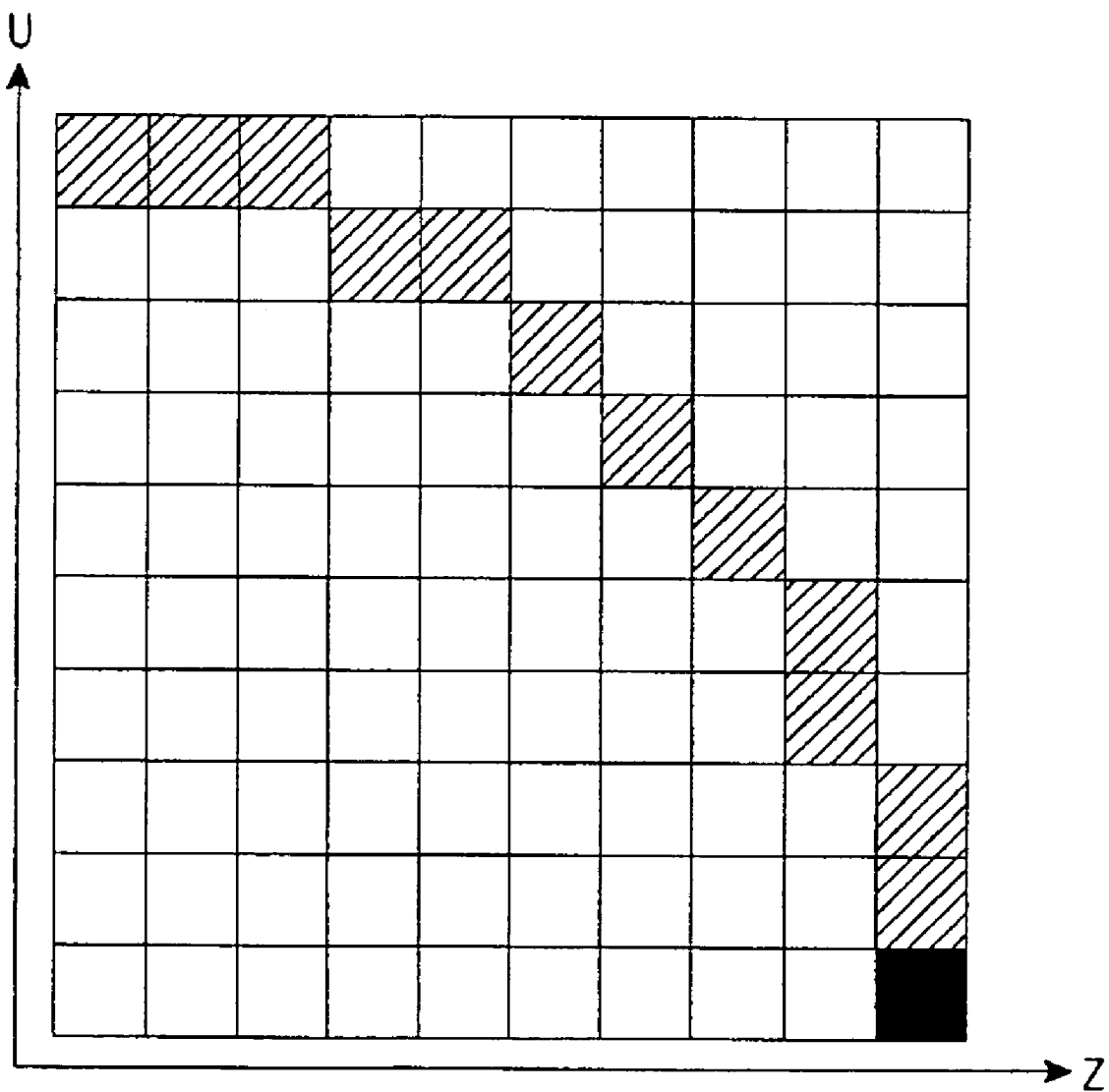
FIG. 9 is a view illustrating a concept of implementing a square root calculation to an integer calculation according to one exemplary embodiment of the present invention.

In addition, a procedure of generating a table of $\sqrt{R^2-u^2}$ only by integer calculation will be briefly described below. In a case of $\sqrt{R^2-u^2}=z$, $u^2+z^2=R^2$ can be obtained by squaring both sides of $\sqrt{R^2-u^2}=z$ so that it can be the equation of a circle. In general, u and z can have a real number value. However, in order to indicate a circle, u and z have to be always an integer as shown in FIG. 9. Therefore, based on the above described fact, it is preferable that a square root required for image projection according to the present invention is obtained by applying Bresenham type algorithm to the present invention, In detail, in order to obtain a square root required for image projection according to the present invention by applying Bresenham type algorithm to the present invention, firstly, an error function can be defined as equation (10) below.

$$\text{RadiusError}(z_i, u_i) = |z_i^2 + u_i^2 - R^2| \qquad (10)$$

In a case where u and z exist on a circle, the value of the error function defined as described above becomes 0. Meanwhile, in a case where u and z do not exist on the circle, as they approach the circle, the value of the error function becomes a value near 0.

Referring to FIG. 9, the value of u always increases as much as 1. Meanwhile, the value of z is equal to a previous value or is a value smaller than the previous value as much as 1. By using this characteristic, u is substituted for z and z−1 of the error function while the value of u increases as much as 1, and the two values are compared with each other, and then x value, which can make the error function smaller, is taken. Such a scheme can be shown as a pseudo-code disclosed in table 2.

TABLE 2

$u_{i+1} = u_i + 1$
Compare RadiusError($z_i, u_{i+1}$) & RadiusError($z_i - 1, u_{i+1}$)
  if RadiusError($z_i, u_{i+1}$) < RadiusError($z_i - 1, u_{i+1}$)
    $z_{i+1} = z_i$
  else $z_{i+1} = z_i - 1$ The initial values of u and z, e.g. $u_0$ and $z_0$ are 0 and R, respectively. These are positions corresponding to a black color pixel. In order to find the position of the next pixel, the values of coordinates corresponding to an upper side and the upper left side of the black color pixel is input to the error function defined as described above, and two obtained values are compared with each other. That is, 1 is substituted for $u_i$, and R and R−1 are substituted for $z_i$ so that the two values of the error function are compared with each other. The value of $\overline{z}_i$ in a smaller one of the two values of the error functions is defined as the value of $z_{i+1}$.

In the FIG. 9, $z_{i+1}$ becomes R. Each value of z corresponding to each u can be obtained though such a calculation. Therefore, without a need for directly obtain a square root, if the value of u in $\sqrt{R^2-u^2}$ is inputted, a corresponding z value, e.g. the value of $\sqrt{R^2-u^2}$ can be obtained. As such, it is possible to obtain a square root required for image projection according to the present invention.

Meanwhile, confirming movement of the photographing apparatus by using the current input image and the previous input image in step 220 is detecting a motion vector between image blocks of frames according to the present invention. Hereinafter, this method will be described in more detail.

As a technique for matching image blocks between frames and detecting a motion vector between them, a motion estimation technique, which is used in a typical moving picture (typically, a broadcast image) compression technology, such as MPEG-4, H.264, etc., can be applied. However, because actual panoramic image photography uses a preview image, it doesn't have superior exposure correction and a low correlation between preview frames in comparison with an ideal broadcast image.

Therefore, it is difficult to find an exact matching block in a case of a typical motion estimation technique being applied. Furthermore, the typical motion estimation technique is a technique based on an effective compression scheme so that it requires a very complicated calculation scheme, such as a scheme for detecting a motion vector, which subdivides the size of a block (a macro block). Therefore, a motion vector detecting scheme suitable for a specific situation of panorama picture photography has been required.

Therefore, when movement between a previous frame and a current frame of an inputted image is caught, the movement is caught by using an image block in a predetermined area. At this time, the typical motion estimation technique isn't used, but a motion estimation technique based on expose correction under consideration of a specific environment of camera photography is suggested. At this time, when the photographing operation is performed, calculation of obtaining a motion vector is progressed with a speed rapid enough to allow a preview to be typically operated simultaneously to the calculating operation. Therefore, in order to reduce the amount of the calculation, an integral image can be used. Also, a reference block for finding a motion vector is variably controlled according to the speed of preview, a relative size of a subject, and a distance from the subject, as much as possible. Due to a characteristic of a preview image, correlation between frames of the preview image is not higher than that of a compressed image. Therefore, in order to maximize the correlation, a single block search method can be used.

Figure 10:
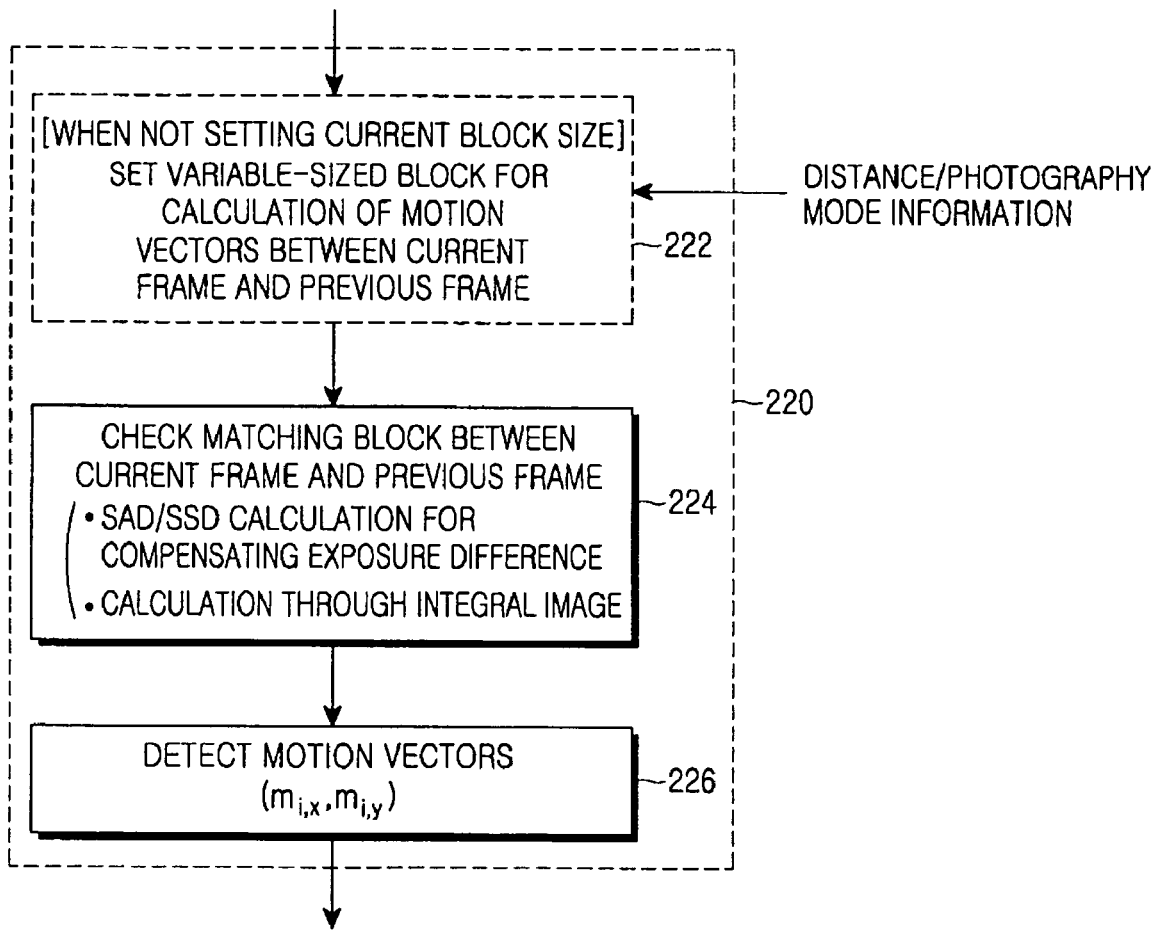
FIG. 10 is a detailed flow chart of the operation of checking movement of a camera in FIG. 5.

FIG. 10 is a flow chart showing exemplary steps of the camera movement confirming operation of FIG. 5, e.g. the operation in step 220, in detail. Hereinafter, referring to FIG. 10, the motion estimation operation according to the present invention will be described in more detail. In Step 222, a block having a variable shape is set up so as to obtain a motion vector between a current frame and a previous frame.

In a case where motion estimation is performed in a preview image, particularly in a case where an photographing apparatus has inferior performance of a sensor and causes much trembling of a user's hand, if motion estimation, which uses a small sized block (typically, a rectangular block having a size of 4~16 pixels), similar to a block used in a moving picture compression method, is applied, vector errors between blocks are accumulated so that it is difficult to find out an exact motion vector value. Because of this accumulation of vector errors between blocks, in an exemplary embodiment of the present invention, a method using a small number of blocks of a comparatively big size (e.g. one block), so as to find out a motion vector value being used.

Figure 11:
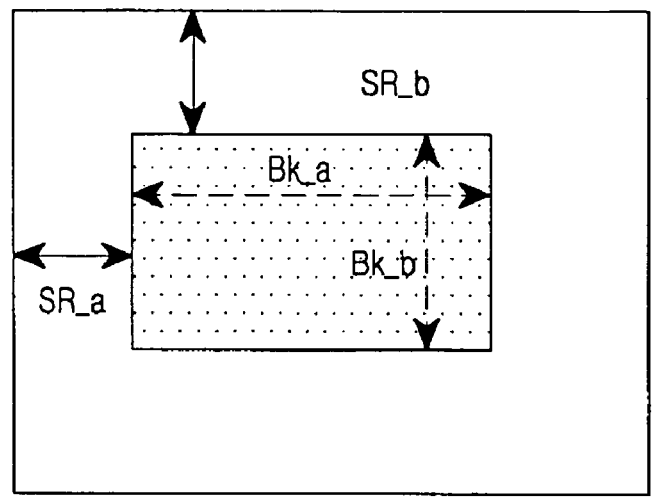
FIG. 11 is a view illustrating an example of an image block, which has a variable size, for detecting a motion vector in FIG. 10.

At this time, the size of the one block is variably controlled by using preview performance of a preview device, a size of a subject, a distance from the subject, and distance information regarding space to be searched for. FIG. 11 is a view showing an example of the size of a block, which is variably determined in a frame. In FIG. 11, a search range (SR) is a searching area, and a block size (BK) is the size of a block.

The SR is an area for searching for a block to be matched with the reference block within a corresponding frame, and it is possible to set up an entire area of the frame as an SR. However, a proper area based on the position of the reference block within the corresponding frame can be set up as an SR, and not using the entire image of the frame. The reason the aforementioned proper area can be set up as an SR is because a searching operation respective to an area to be predicted as and unnecessary area, such as an edge of the frame, is previously blocked off so as to increase effectiveness.

In an exemplary embodiment of the present invention, such a SR and the size of a block can be variably set up. For example, in a case where a short distance subject or a subject having a relatively big size is photographed, if the size of the block becomes bigger, and the SR is reduced, it is possible to obtain a more accurate motion vector. On the other hand, in a case where a long distance subject or a subject having a relatively small size is photographed, if the size of the block becomes smaller, and the SR is expanded, it is possible to obtain a more accurate motion vector.

Also, in a case where the preview performance of the photographing apparatus is not good, for example if the SR is excessively expanded, the amount of calculation increases. Therefore, it takes a long time to find out a motion vector so that the speed of the frame is relatively slower. Also, even though an accurate motion vector is obtained, if the speed of the frame is slow so that an image difference between frames is bigger, errors caused by the image difference can be accumulated.

Thus, when a motion vector is extracted in a camera preview, basic information regarding an object to be photographed is obtained by using a method, such as an object detector, or by using automatic input information, such as a focus distance, etc., or passive input information from the user (distance information or object information, which can be predicted in user setting information, such as a short distance photography mode, or a landscape mode, a user mode, etc.). Based on the basic information, a SR can be set up according to a photographing distance and the size of an object). In addition, a standard size of a block can be set up under consideration of the amount of calculation according to the preview performance of the corresponding photographing apparatus.

If the size of a current block has not been set up, e.g. in case where a motion extracting operation is performed for the first time, the operation of setting up a block having various sizes in step 222 is performed only one time, and the block having a size set up at first is used until a corresponding panoramic image photographing operation is subsequently finished.

Then, in step 224, the operation of confirming matching blocks between the current frame and the previous frame is performed by using the block having the size set up in step 222. A scheme for finding out the matching block basically uses error information of pixels of blocks to be compared with each other. In a case where an error between two blocks is the smallest, the corresponding blocks are considered as the matching blocks.

The error information can be obtained by calculating a mathematical function, such as Sum of Absolute Difference (SAD), Sum of Squared Difference (SSD), etc. For example, the error information can be obtained by calculating equation (11) below. That is, the error information can be obtained by calculating SAD and SSD, which are typically used in a moving picture compression technique in step 224.

$$SAD \quad (11)$$
$$E(m, n) = \sum_{a,b \in block} |I_1(a, b) - I_2(a+m, b+n)|$$

$$SSD$$
$$E(m, n) = \sum_{a,b \in block} |I_1(a, b) - I_2(a+m, b+n)|^2$$

In equation (11) above, $I_1$ and $I_2$ are pixel values (brightness or each color) of corresponding positions of blocks (the pixel position of the reference block in the previous frame is defined as a, b, and the pixel position of the block to be searched in the current frame is defined as a+m, b+n) within the frames (i.e. the previous frame and the current frame), respectively.

However, as an ideal scheme, it is possible to obtain error information between two blocks by calculating the above described function. However, under an actual photographing environment, an exposure difference between two frames adjacent to each other, such as image frames directly inputted from a subject, can exist. Therefore, it is impossible to accurately obtain error information between the two blocks. Therefore, a method for obtaining the error information under consideration of the expose difference is required. Therefore, in the present invention, as shown in equation (12), error information between the two blocks is obtained by using an error function considering the expose difference.

$$\text{modified } SAD \quad (12)$$
$$E(m, n) = \sum_{a,b \in block} \left| I_1(a,b) - \bar{I}_1 - (I_2(a+m, b+n) - \bar{I}_2(a,b)) \right|$$

$$\text{modified } SSD$$
$$E(m, n) = \sum_{a,b \in block} \left\{ I_1(a,b) - \bar{I}_1 - (I_2(a+m, b+n) - \bar{I}_2(a,b)) \right\}^2$$

Herein, $\bar{I}_1$ and $\bar{I}_2$ are average values of pixels of blocks within the frames (i.e. the previously frame and the current frame), respectively.

With reference to equation (12), as a scheme suggested in the present invention in order to obtain error information, an exposure correction is performed in such a manner that each pixel value of the corresponding block of each frame is corrected according to an average value of the corresponding image block (in such a manner that the average values are excluded in equation (12) above).

Furthermore, because the position of the block is fixed in the previous frame (i.e. the reference block is one), it is enough to obtain $\bar{I}_1$ just one time. However, in order to find out a block to be matched with the block of the previous frame at the most preferable degree, all blocks having the same size have to be searched for. Therefore, whenever such searching is performed, an average value of pixels of a corresponding block has to be obtained. Particularly, $\bar{I}_2(m,n)$ is calculated respective to all blocks.

Figure 12A:
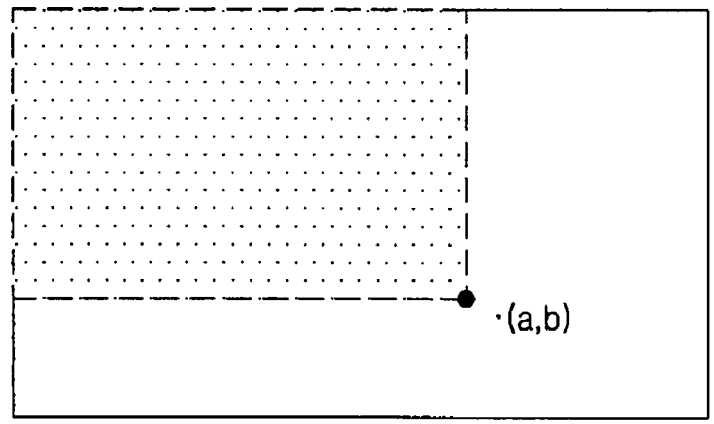
FIGS. 12A and 12B are views illustrating an example of an integral image.

Also, a large amount of calculation is required in adding all pixels in a block and obtaining an average value of them every time. Therefore, the present invention discloses a scheme for reducing the amount of calculation by using an integral image. The integral image is an image constituted by pixels from a left upper end of the image to corresponding coordinates, and the integral image value is the sum total of pixel values included in the integral image. For example, in FIG. 12A, an integral image is an image of a block area indicated as dotted lines, and the value of the integral area shows the sum total of pixels included in the area. Particularly, $I_{intg}(0, 0)$ is a pixel value in (0, 0), and the sum total of all pixels of the given image can be obtained through calculation of $I_{intg}$ (width−1, height−1).

Figure 12B:
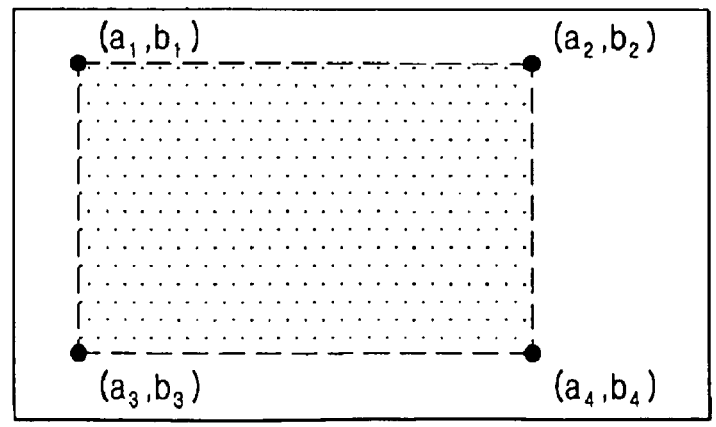

When using such an integral image, through utilization of the sum total and the difference between pixel values corresponding to four vertexes of a desire area, the sum total of the pixel values within the area can be obtained. The sum total of Pixel values corresponding to a block area indicated as dot lines in FIG. 12b can be obtained by using pixel values of (a1, b1), (a2, b2), (a3, b3), (a4, b4) which are four vertexes, as shown in equation (13).

$$I_{intg}(a_4,b_4)+I_{intg}(a_1,b_1)-I_{intg}(a_2,b_2)-I_{intg}(a_3,b_3) \quad (13)$$

According to an exemplary embodiment of the present invention, after the integral image respective to the current frame is previously measured as described above, $\bar{I}_2(m,n)$, i.e. an average value of all pixels of the block can be simply obtained by using such an integral image.

If the matching blocks between the current frame and the previous frame are checked in step 224, afterward, a motion vector between the two blocks, i.e. a motion vector corresponding to an x axis, is obtained as $m_{i,x}$, and a motion vector corresponding to a y axis, is obtained as $m_{i,y}$. As such, the panoramic image photographing operating can be performed as described above. Meanwhile, although a detailed embodiment is described in the present invention, various changes thereof can be possible without departing from the scope of the present invention.

For example, in order to find out a motion vector in a typical manner, a scheme for finding out a motion vector respective to a plane image is used. Through this scheme, a better result can be obtained within the range of a typical compression image or a broadcast image.

However, in a case where a motion vector is obtained so as to perform panoramic image photography, the reason why the motion vector is obtained is to get a more accurate panorama picture.

Furthermore, it is preferable that a motion vector can be obtained by using frame skip under consideration of a preview speed characteristic of an apparatus. Particularly, in a case of compression of moving pictures, vector information is important in each frame so that a motion estimation operation is performed in each frame. However, it is not necessary that information is important in each frame in a motion estimation operation for panoramic picture photography according to the present invention.

Therefore, according to another exemplary embodiment of the present invention, a motion estimation operation is performed while properly skipping a frame (e.g. one or two frames) according to each situation. In such a case, it is possible to reduce the amount of time spent calculating, as well as the amount of calculating according to the skipping of the frame, to secure a larger searching area. As such, a more accurate motion vector calculating operation can be performed.

In addition, although it has been described that the photographing apparatus according to the present invention is moved by the user in photographing a panoramic picture, it is within the spirit of the invention and the scope of the appended claims to apply the present invention without any change to a case where the photographing apparatus according to the present invention automatically moves in a state of it being assembled with a separate moving apparatus. Also, although it has been described that the panoramic image photographing direction is a horizontal direction or a vertical direction in photographing a panorama picture, it is within the spirit of the invention and the scope of the appended claims to apply the present invention to a case where the panoramic image photographing direction is a direction mixed with the horizontal direction or the vertical direction (in a case where a plurality of images constituting a panorama picture is arranged with a mosaic shape in vertical and transverse directions. Also, it is understood that various UI can be shown in various manners in addition to the above described manner.

In addition, those skilled in the art will appreciate that various modifications, additions and substitutions are possible. Accordingly, the scope of the invention is not to be limited by the above exemplary embodiments.

What is claimed is:

1. A panoramic picture photographing method comprising the steps of:
   (a) projecting an image comprising a plurality of individual images of different frames that have each been successively inputted in a predetermined unit of time to an imaginary surface having a same focal distance in photographing each individual image and the surface defining a panoramic picture comprising the projected image;
   (b) confirming movement of a corresponding photographing apparatus by comparing a current image with a previous image in real time using a motion estimation technique to which exposure correction has been applied;
   (c) determining a photographing time point of each individual image by confirming the confirmed movement in step (b) according to a photographing direction reaching a predetermined critical value; and
   (d) photographing each individual image at the photographing time point automatically or via a user input;
   wherein, projecting the image in step (a) comprises calculating a pixel corresponding to point (x, y) in an image coordinate system having a center of the image frame as an origin according to the following:

$$I\left(f\frac{u}{\sqrt{R^2-u^2}}, f\frac{v}{\sqrt{R^2-u^2}}\right),$$

wherein, f is a focal distance of each image, θ is a rotational angle between images, the image coordinate system having the center of the image frame as an origin is (x, y), the pixel corresponding to a position of point (x, y) is I(x, y), R is a radius, and a cylindrical coordinate formed based on the radius R is (u, v)=(Rθ, v).

2. The panoramic picture photographing method as claimed in claim 1, wherein in the motion estimation technique using exposure correction in step (b), a motion vector between image blocks matching with each other is obtained by using error information between pixels of the image blocks of frames to be compared with each other, and each pixel in each block is corrected according to an average value of each corresponding image block to apply the exposure correction.

3. The panorama picture photographing method as claimed in claim 2, wherein the error information is obtained through calculating a sum of absolute difference (SAD) or a sum of squared difference (SSD) through equation (1) below:

modified SAD $$E(m,n) = \sum_{a,b \in block} \left| \frac{I_1(a,b) - \bar{I}_1 - (I_2(a+m, b+n) - \bar{I}_2(a,b))}{\bar{I}_2(a,b)} \right| \quad (1)$$

modified SSD $$E(m,n) = \sum_{a,b \in block} \left\{ \frac{I_1(a,b) - \bar{I}_1 - (I_2(a+m, b+n) - \bar{I}_2(a,b))}{\bar{I}_2(a,b)} \right\}^2,$$

wherein, $I_1$ and $I_2$ are pixel values of a position of a, b and a position of a+m, b+n in the image blocks within a previous frame and a current frame, respectively, and $\bar{I}_1$ and $\bar{I}_2$ are average values of corresponding pixels of the image blocks within the previous frame and the current frame, respectively.

4. The panoramic picture photographing method as claimed in claim 3, wherein, in a case where the average values of the pixels are obtained, an integral image respective to the current frame is preset, and an average of a pixel included in the integral image is calculated.

5. The panoramic picture photographing method as claimed in claim 2, wherein, when a motion vector between each the image blocks is obtained, a single block searching scheme is used.

6. The panoramic picture photographing method as claimed in claim 2, wherein the image block is variably set according to a preview performance, a distance from a subject, and/or photographing mode information.

7. The panoramic picture photographing method as claimed in claim 6, including variably setting a searching area for searching for a matching block together with the image block.

8. The panoramic picture photographing method as claimed in claim 1, wherein the imaginary surface is a cylindrical surface or a spherical surface, which has the same focal distance from a reference point.

9. The panoramic picture photographing method as claimed in claim 1, wherein point (u, v) corresponding to the pixel included in the projected image satisfies each range of equations (3) and (4):

$$-W/2 \leq u \leq W/2 \quad (3),$$

herein, W is a width of image frame I, $$-H/2 \leq v \leq H/2 \quad (4)$$

herein, H is a height of image frame I.

10. The panoramic picture photographing method as claimed in claim 1, wherein $\sqrt{R^2-u^2}$ is obtained through integer calculation utilizing a Bresenham type algorithm.

11. The panoramic picture photographing method as claimed in claim 1, wherein pixel values corresponding to (−u, v), (u, −v), (−u, −v) are obtained, respectively, by using y axis symmetry, x axis symmetry, and origin symmetry respective to (u, v).

12. The panoramic picture photographing method as claimed in claim 1, wherein calculating a radius R of the cylindrical coordinate is obtained through equation below:

$$I\left(f\tan\frac{u}{R}, f\frac{v}{R\cos(u/R)}\right).$$

13. A panoramic picture photographing method, in which movement of a photographing apparatus is confirmed, the method comprising:
- (a) projecting an image comprising a plurality of individual images of different frames inputted in real time to an imaginary surface having a same focal distance and obtaining the projected image;
- (b) confirming matching image blocks between a currently input frame and a previously input frame of the projected image;
- (c) confirming movement of the photographing apparatus by obtaining a motion vector between the confirmed matching image blocks, wherein, in confirming the image blocks matching with each other, correcting respective pixels of the image blocks of respective frames according to an average value of a corresponding image block, and obtaining a motion vector between the matching image blocks from step (b) by using error information regarding the respective corrected pixels, which are compared with each other between the image blocks of respective frames;

wherein, projecting the image in step (a) comprises calculating a pixel corresponding to point (x, y) in an image coordinate system having a center of the image frame as an origin according to the following:

$$I\left(f\frac{u}{\sqrt{R^2-u^2}}, f\frac{v}{\sqrt{R^2-u^2}}\right),$$

wherein, f is a focal distance of each image, θ is a rotational angle between images, the image coordinate system having the center of the image frame as an origin is (x, y), the pixel corresponding to a position of point (x, y) is I(x, y), R is a radius, and a cylindrical coordinate formed based on the radius R is (u, v)=(Rθ, v).

14. The method as claimed in claim 13, wherein the confirming of matching image blocks in step (b) comprises determining where an error between pixel values of two corresponding image blocks is the smallest.

15. The method as claimed in claim 13, wherein the individual images are obtained moving a camera so as to photograph a panoramic image according to movement of the camera.

16. The method as claimed in claim 15, wherein the motion of the camera to obtain the individual images is automatic.

17. The method as claimed in claim 15, further comprising notifying to user through a User interface (UI) to move the camera to obtain each of the individual images.

18. The method as claimed in claim 17, wherein the notifying of the user is performed by providing an audible cue.

19. The method as claimed in claim 17, wherein the notifying of the user is performed by providing a visual cue.

* * * * *